US009892459B2

(12) United States Patent
Nangalia et al.

(10) Patent No.: US 9,892,459 B2
(45) Date of Patent: Feb. 13, 2018

(54) METHODS AND APPARATUS FOR ROUTING SECURITIES ORDERS

(75) Inventors: Rishi Nangalia, New York, NY (US); John Mahoney, New York, NY (US); Debra L. Ribaudo, Brooklyn, NY (US)

(73) Assignee: Goldman Sachs & Co. LLC, New York, NY (US)

( * ) Notice: Subject to any disclaimer, the term of this patent is extended or adjusted under 35 U.S.C. 154(b) by 1303 days.

(21) Appl. No.: 12/133,139

(22) Filed: Jun. 4, 2008

(65) Prior Publication Data

US 2008/0243700 A1    Oct. 2, 2008

Related U.S. Application Data

(63) Continuation of application No. 10/727,418, filed on Dec. 4, 2003, now abandoned.

(51) Int. Cl.
G06Q 30/00     (2012.01)
G06Q 40/04     (2012.01)
G06Q 20/38     (2012.01)

(52) U.S. Cl.
CPC .......... G06Q 40/04 (2013.01); G06Q 20/382 (2013.01)

(58) Field of Classification Search
USPC ...................................... 705/35, 37
See application file for complete search history.

(56) References Cited

U.S. PATENT DOCUMENTS

| 5,093,794 | A | * | 3/1992 | Howie et al. ............... 700/100 |
| 5,101,353 | A |   | 3/1992 | Lupien et al. |
| 5,530,744 | A | * | 6/1996 | Charalambous et al. .................. 379/266.08 |
| 6,408,282 | B1 |  | 6/2002 | Buist |
| 7,058,587 | B1 | * | 6/2006 | Horne .......................... 705/7.22 |
| 2001/0042040 | A1 |  | 11/2001 | Keith |
| 2002/0010672 | A1 | * | 1/2002 | Waelbroeck et al. ........... 705/37 |
| 2002/0052827 | A1 | * | 5/2002 | Waelbroeck et al. ........... 705/37 |
| 2002/0087454 | A1 | * | 7/2002 | Calo ..................... G06Q 30/06 705/37 |
| 2002/0087455 | A1 | * | 7/2002 | Tsagarakis ........... G06Q 20/382 705/37 |
| 2002/0091606 | A1 | * | 7/2002 | Shapiro .......................... 705/36 |
| 2003/0177082 | A1 |  | 9/2003 | Buckwalter |
| 2004/0034591 | A1 | * | 2/2004 | Waelbroeck ....... G06Q 30/0251 705/37 |

(Continued)

FOREIGN PATENT DOCUMENTS

WO    9506918 A2    3/1995

OTHER PUBLICATIONS

Committee on the Global Financial System "The implications of electronic trading in financial markets" (Jan. 2001) http://www.bis.org/publ/cgfs16.pdf.*

(Continued)

Primary Examiner — Asha Puttaiah

(57) ABSTRACT

According to some embodiments, a securities order trading system may determine, during a trading session, one or more attributes of an order destination. The attribute or attributes may be other than a price quoted or a size of an order booked on an order destination. The trading system may also determine during the trading session, and based on the order destination attribute or attributes, at least one of whether to route an order to the order destination, and a proportion of the order to allocate to the order destination.

20 Claims, 9 Drawing Sheets

(56) References Cited

U.S. PATENT DOCUMENTS

| | | | |
|---|---|---|---|
| 2004/0059666 A1* | 3/2004 | Waelbroeck | G06Q 40/04 705/37 |
| 2004/0088242 A1* | 5/2004 | Ascher | G06Q 40/00 705/37 |
| 2004/0143538 A1 | 7/2004 | Korhammer et al. | |
| 2004/0210511 A1* | 10/2004 | Waelbroeck | G06Q 40/04 705/37 |
| 2005/0044031 A1 | 2/2005 | Lebedev | |

OTHER PUBLICATIONS

"PCT International Search Report of the International Searching Authority", dated Apr. 20, 2005, for PCT/US04/40723, 3pgs.
PCT Application No. PCT/US04/40723, International Preliminary Report on Patentability dated Jun. 6, 2006, 4 pages.

* cited by examiner

| DESTINATION 300 | RESPONSE TIME 302 | FILL RATE 304 | % OF VOLUME 306 | OLV-Q 308 | OVERHIT 310 | TRIGGERS 312 | SPEED RATING 314 |
|---|---|---|---|---|---|---|---|
| A | 0.35 | 50% | 20% | 800 | 15 | 1 | 69 |
| B | 0.5 | 45% | 30% | 1000 | 10 | 2.5 | 127 |
| C | 0.2 | 65% | 35% | 900 | 25 | 1 | 481 |
| D | 0.35 | 80% | 15% | 700 | 40 | 2 | 348 |

| DESTINATION 400 | AVERAGE TIME AT NBBO 402 | % OF TIME AT NBBO 404 | NO. OF TIMES AT NBBO 406 | AVG. TIME TO JOIN NBBO 408 | TRIGGERS 410 | PRICE RATING 412 |
|---|---|---|---|---|---|---|
| A | 6.5 | 45% | 1620 | 6.2 | 1 | 194 |
| B | 5.8 | 25% | 1009 | 7.1 | 2.5 | 132 |
| C | 9.1 | 50% | 1286 | 6.5 | 1 | 234 |
| D | 5.2 | 15% | 675 | 5.9 | 2 | 62 |

METHODS AND APPARATUS FOR ROUTING SECURITIES ORDERS

CROSS-REFERENCE TO RELATED APPLICATION

This is a continuation of prior co-pending patent application Ser. No. 10/727,418, filed Dec. 4, 2003.

FIELD

The present invention relates to electronic trading of securities. In some embodiments, the present invention relates to methods and apparatus for processing and routing securities orders.

BACKGROUND

Existing securities order processing and routing systems may make routing decisions based on current order book conditions at various potential order destinations such as securities exchanges, market makers or specialists, and/or ECNs (Electronic Communication Networks). ECNs are private electronic networks that allow for placement of securities trading orders and are fully automated to match orders and set prices for trades without the intervention of market makers. Order routing decisions, whether to securities markets, market makers or ECNs, may also be based at least in part on historical data that has been compiled for the order destinations. However, routing decisions based only on current order book conditions and/or on historical data that has customarily been used may not optimize trading performance.

SUMMARY

To address the foregoing, embodiments of the present invention concern a method, an apparatus, and a medium storing processor-executable process steps to determine during a trading session an attribute of an order destination other than a quoted security price and an order size for an order destination, and to determine during the trading session, based at least in part on the determined attribute, at least one of: (a) whether to route an order to the order destination, and (b) a proportion of the order to allocate to the order destination.

As used herein and in the appended claims, "order destination" refers to any one or more of a securities exchange, a market maker and an ECN; and "trading session" includes one or both of (a) a calendar day, and (b) a period during a calendar day during which a market or ECN is open for trading.

In some aspects, the determined attribute may be one or more of: (a) an average response time exhibited by the order destination during the trading session in regard to orders for a particular security; (b) a percentage of total market volume in the particular security handled during the trading session by the order destination; (c) a degree to which the order destination is overfilling orders for the particular security during the trading session; (d) an average amount of time that the order destination offered a best price for the particular security relative to other order destinations; (e) a percentage of the trading session during which the order destination offered a best price for the particular security relative to other order destinations; (f) a number of times during the trading session at which the order destination offered a best price for the particular security relative to other order destinations; and (g) an average amount of time required during the trading session for the order destination to match a best price offered for the particular security by another order destination.

Thus, in some aspects, an order routing decision may be based on information, in addition to order price and size of orders pending on an order destination, that is dynamically updated during a trading session. With routing based on such dynamically updated information, order routing may be performed in an automated yet insightful manner to take advantage of dynamically changing market behaviors that are not directly reflected in current order book conditions. Improved order execution, in regard to either or both of price obtained and speed of execution, may thereby be achieved.

With these and other advantages and features of the invention that will become hereinafter apparent, the invention may be more clearly understood by reference to the following detailed description of the invention, the appended claims, and the drawings attached hereto.

BRIEF DESCRIPTION OF THE DRAWINGS

FIGS. 3 and 4 are tables illustrating exemplary data structures of order destination databases for use in the present invention.

DETAILED DESCRIPTION

Figure 1:
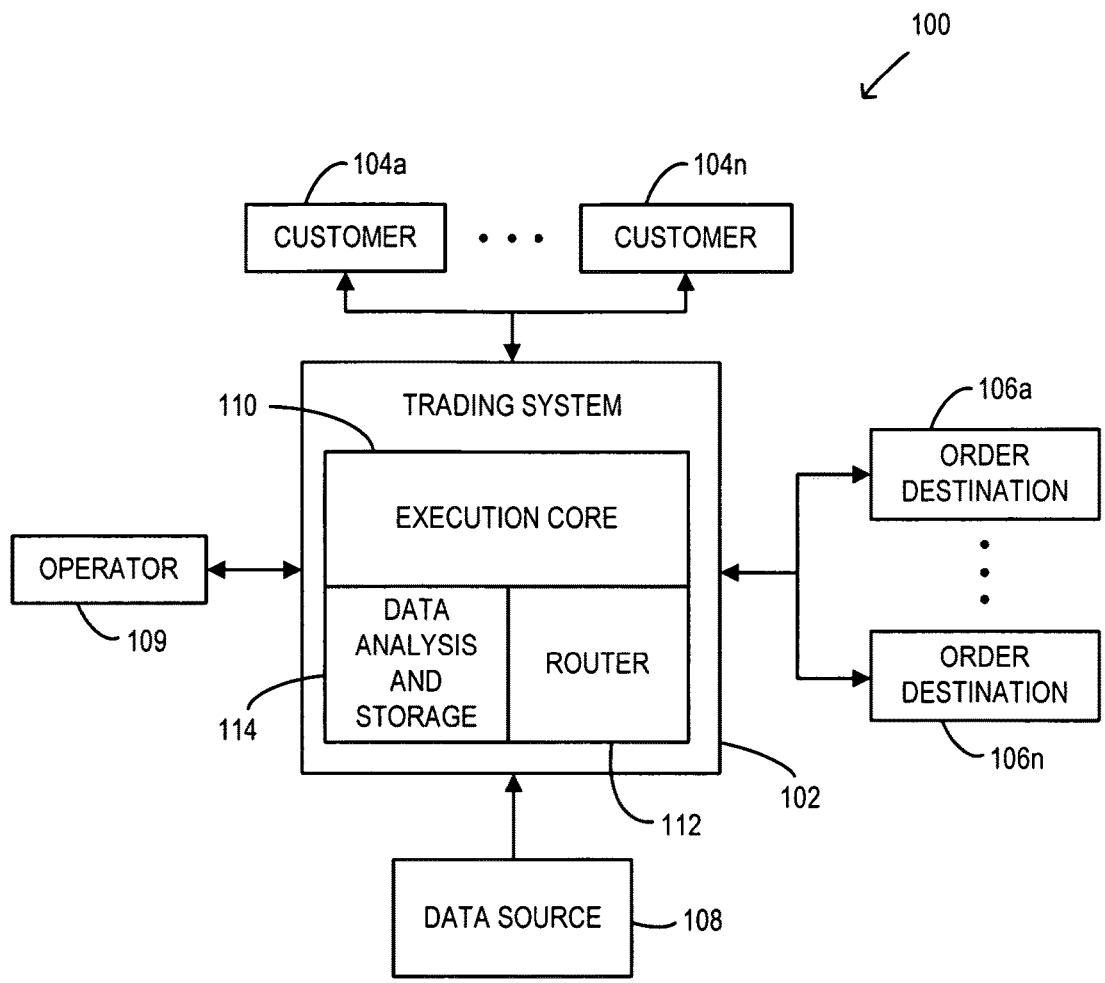
FIG. 1 is a block diagram of a system consistent with the present invention.

In general, and for the purposes of introducing concepts of embodiments of the present invention, data regarding one or more attributes of a number of order destinations is dynamically updated during a trading session. The data relates to information other than the current contents of order books of the order destinations. The data is used during the same trading session in making routing decisions among the order destinations. For example, an order may be apportioned among the order destinations on the basis of a calculation that uses the dynamically updated data regarding the order destination attributes.

Features of some embodiments of the present invention will now be described by first referring to FIG. 1 where a block diagram of one embodiment of a trading network 100 is shown. As shown, trading network 100 includes a number of different components which cooperatively operate to process, route and execute securities trading orders pursuant to some embodiments of the present invention.

As depicted, trading network 100 includes a trading system 102 in communication with one or more customer(s) 104, a plurality of order destinations 106, a source 108 of order destination data, and one or more operator devices 109 (only one shown). Trading system 102, in some embodiments, includes an execution core 110, a router 112 and an order destination data analysis and storage capability 114. Execution core 110 may be any trading execution software, systems and/or devices which are configured to receive customer orders and process them to execute orders on behalf of customers. In some embodiments, execution core 110 may function to timestamp orders when received and to assign an order identifier or sequence number to each order.

Router 112 may be configured to receive an order from execution core 110 or to receive information about an order and to make a determination as to how the order is to be routed. That is, the router 112 determines an order destination or order destinations to which the order is to be routed, and if the order is to be divided among two or more order destination, the router 112 determines the respective proportions of the order to be allocated to the order destinations. Details of the operation of router 112 will be discussed below. The router may execute the routing decision that it makes, or may provide information concerning the routing decision to the execution core 110 to allow the execution core 110 to execute the order in accordance with the routing decision made by router 112.

Data analysis and storage capability 114 operates to receive from the data source 108 data concerning the order destinations 106 and to maintain and update databases (to be discussed below) concerning the order destinations based on the data received from data source 108. As will be seen, the databases may also reflect data derived from direct experience of the trading system 102 in dealing with the order destinations 106. The data analysis and storage capability 114 may receive at least some of the data for the databases, and may analyze the data and update the databases, on a dynamic basis during each trading session. The databases are accessible to router 112 and the routing decisions made by router 112 may be based, at least in part, on the data in the databases.

Although a single trading system 102 is shown in FIG. 1, any number of trading systems may be included in trading network 100. Similarly, any number of data sources 108, customer devices 104, order destinations 106, operator devices or any other device described herein may be included in the trading network 100 according to embodiments of the present invention.

Each of the devices of trading network 100 may be formed of components or other devices capable of performing the various functions described herein. For example, a customer device 104 may be a computing device such as a Personal Computer (PC), a laptop, a telephone, or other device associated with a customer. As used herein, the term "customer" may refer to, for example, an individual or other entity that buys and sells securities (and pursuant to some embodiments of the present invention, options; for purposes of this disclosure and the appended claims "securities" will be understood to include options). For example, a customer operating a customer device may be a broker or other entity desiring to purchase or sell securities using features of embodiments of the present invention. The broker or other entity may be operating on behalf of the ultimate purchaser or seller of the securities.

An order destination 106 may include any computing device(s) operated by or on behalf of one or more order destinations. Each of the order destinations may be in communication with other devices described herein, such as the data source 108, using techniques known in the art. In general, the data source 108 may receive information from the order destinations 106 upon the occasion of each order received by the order destinations and/or after the completion of each trading transaction. Each order destination 106 may include one or more operator terminals allowing specialists or traders at the order destination to respond to orders received and to complete execution of an order pursuant to its terms.

Operator device 109 may, for example, be constituted by a computer terminal or by a computing device such as a PC or a laptop in communication with the trading system 102.

As used herein, devices (e.g., trading system 102, operator device 109, order destinations 106, customer devices 104 and data sources 108) may communicate, for example, via one or more communication networks. For example, some or all of the devices may be in communication via an Internet Protocol (IP) network such as the Internet. Some or all of the devices may be in communication via other types of networks such as an intranet, a Local Area Network (LAN), a Metropolitan Area Network (MAN), a Wide Area Network (WAN), a proprietary network, a Public Switched Telephone Network (PSTN), and/or a wireless network.

According to some embodiments of the present invention, communication between some or all of the devices of trading network 100 may be via temporary computer communication channel (e.g., a logic path through which information can be exchanged). In other words, the communication channel between various devices may be established and discontinued as appropriate. For example, trading system 102 may exchange information with one of the order destinations 106 only when communication is necessary to transmit an order for execution by the order destination 106 or to receive confirmation from the order destination 106 that the order was executed.

According to some embodiments, some or all of the devices may communicate with other devices via a public computer communication network. That is, at least a portion of the communication network may be accessed by devices other than the devices depicted in FIG. 1. Note, however, that the information exchanged between trading system 102 and other devices in FIG. 1 may be encrypted or otherwise protected to prevent a third party from accessing, manipulating, understanding and/or misusing the information. In some embodiments, some or all of the devices may communicate over a private network.

In other embodiments, the devices of FIG. 1 are connected differently than as shown. For example, some or all of the devices may be connected indirectly to one another (e.g., via the Internet). Of course, embodiments of the invention may include devices that are different from those shown. It should also be noted that although the devices are shown in communication with each other, the devices need not be constantly exchanging data. Rather, communication may be established when necessary and severed at other times or always available but rarely used to transmit data. Moreover, although the illustrated communication links appear dedicated, it should be noted that each of the links may be shared by other devices.

Figure 2:
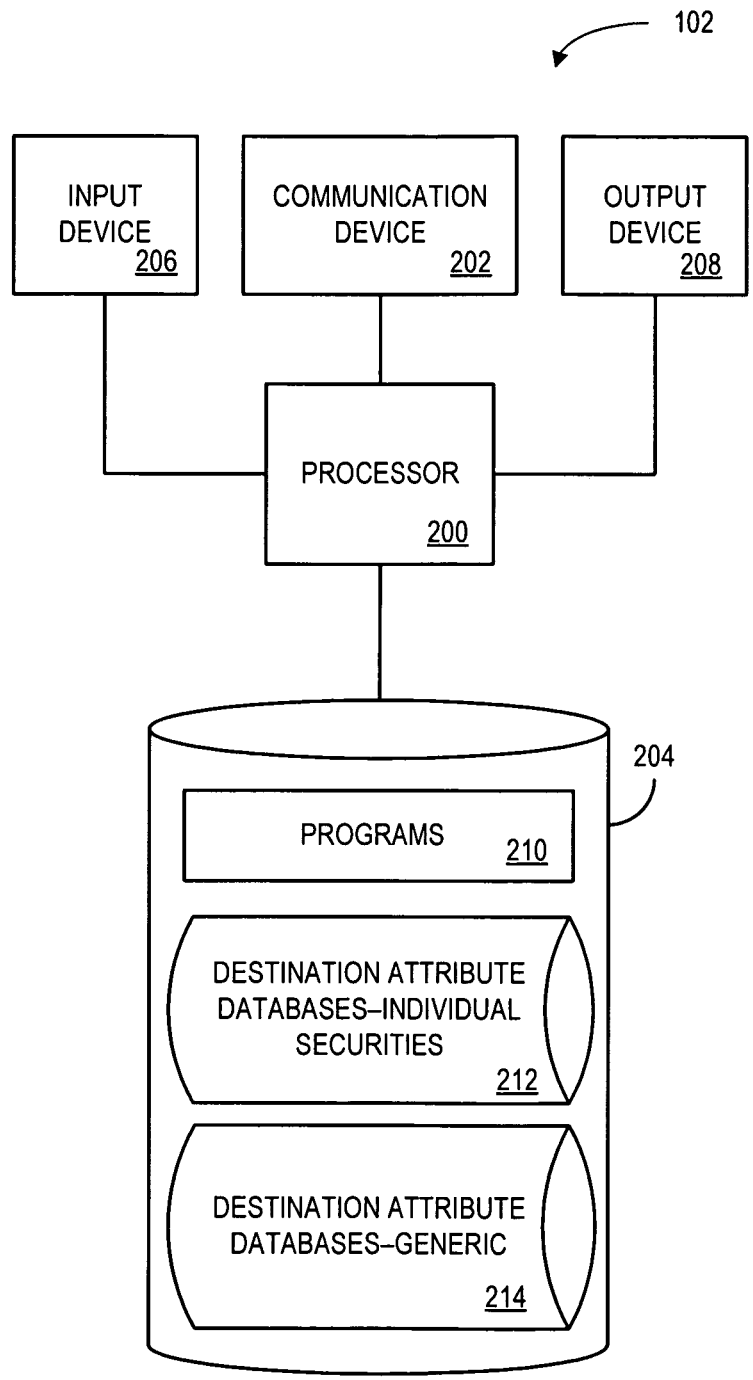
FIG. 2 is a block diagram of one embodiment of a trading system for use in conjunction with the system of FIG. 1.

Reference is now made to FIG. 2, where an embodiment of trading system 102 is shown. As depicted, trading system 102 includes a computer processor 200 operatively coupled to a communication device 202, a storage device 204, an input device 206 and an output device 208.

Processor 200 may be constituted by one or more conventional processors, and may, for example, comprise RISC-based and other types of processors. Processor 200 operates to execute processor-executable process steps so as to control the elements of trading system 102 to provide desired functionality.

Communication device 202 may be used to facilitate communication with, for example, other devices (such as customer devices 104, order destinations 106, data source 108 and operator device 109). Communication device 202 is therefore preferably configured with hardware suitable to physically interface with desired external devices and/or network connections. For example, communication device 202 may comprise an Ethernet connection to a local area network through which trading system 102 may receive and transmit information over the World Wide Web.

Input device 206 may comprise, for example, a keyboard, a keypad, a mouse or other pointing device, a microphone, knob or switch, an infra-red (IR) port, a docking station, and/or a touch screen. Output device 208 may comprise, for example, a display (e.g., a display screen), a speaker, and/or a printer. Input device 206 and output device 208 may together constitute or be constituted by operator device 109 (FIG. 1).

Storage device 204 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices.

Storage device 204 stores one or more programs 210 for controlling processor 200. The programs 210 comprise processor-executable process steps of trading system 102, including process steps that constitute processes provided in accordance with principles of the present invention, as described in more detail below. Processor 200 performs instructions of programs 210, and thereby operates in accordance with the present invention. In some embodiments, programs 210 may be configured, at least in part, as a neural network or other type of program using techniques known to those skilled in the art to achieve the functionality described herein. In some embodiments, programs 210 may provide the functionality of each of the major components of trading system 102, including execution core 110, router 112 and data analysis and storage capability 114 (FIG. 1). Further details of the programs 210 will be discussed below.

Any or all process steps of trading system 102 may be read from a computer-readable medium, such as a floppy disk, a CD-ROM, a DVD-ROM, a Zip™ disk, a magnetic tape, or a signal encoding the process steps, and then stored in storage device 204 in a compressed, uncompiled and/or encrypted format. Processor-executable process steps being executed by processor 200 may typically be stored temporarily in RAM (not separately shown) and executed therefrom by processor 200. In alternative embodiments, hard-wired circuitry may be used in place of, or in combination with, processor-executable process steps for implementation of processes according to embodiments of the present invention. Thus, embodiments of the present invention are not limited to any specific combination of hardware and software.

Storage device 204 also stores databases, including, for example, order destination attribute databases 212 relating to individual securities and "generic" order destination attribute databases 214, which store data concerning attributes of order destinations with respect to a plurality of and/or all securities traded at an order destination. For example, in some embodiments, the generic order destination attribute databases may contain data that represents characteristics of all trading activity on the order destinations, or of all trading activity in securities that are not represented in the individual security databases 212. In some embodiments, respective dedicated databases 212 may be maintained for perhaps 100 or 200 leading securities for a given securities market. Routing decisions for these securities may be based at least in part on data stored in the respective dedicated databases 212 for those securities. Routing decisions for other securities may be based at least in part on data stored in generic databases 214.

Other databases may also be provided (e.g., order and execution data may also be stored in storage device 204). Examples of the order destination attribute databases 212, 214 are described below in conjunction with FIGS. 3 and 4. Those skilled in the art, upon reading this disclosure, will understand that a number of different forms of order destination attribute data may be utilized.

There may also be stored in storage device 204 other unshown elements that may be necessary for operation of trading system 102, such as an operating system, a database management system, other applications, other data files, and "device drivers" for allowing processor 200 to interface with devices in communication with communication device 202. These elements are known to those skilled in the art, and are therefore not described in detail herein.

Referring now to FIG. 3, a table represents an order destination attribute database 212 or 214 for use when speed of execution is a primary aim of a routing determination. This database is described in detail below and depicted with exemplary entries in the accompanying figure. As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information only. Those skilled in the art will understand that the number and contents of the entries can be different from those illustrated herein.

The database illustrated in FIG. 3 may contain data relating to trading in a single security, in which case the database is one of the order destination databases 212 relating to individual securities. Alternatively, the database illustrated in FIG. 3 may be a "generic" order destination attribute database 214, and so may contain data relating to trading in a plurality of securities (e.g., all securities available for trading or served by a particular market, or all securities available for trading or served by a particular market for which an individual database 212 is not maintained).

Order destination attribute database 212 or 214 (as depicted in FIG. 3) contains data gathered as to a plurality of order destinations. The data may be indicative of the likely performance of the order destinations in regard to speed of executing an order that may be routed to the order destinations. This data may be generated on the basis of trading and/or order book information received on a batch or real-time basis from the data source 108 (FIG. 1) and/or may be based on experience accumulated by the trading system 102 in direct dealings with the order destinations.

As depicted, the table defines a number of fields 300-314 for each of the entries. Each entry corresponds to a respective order destination to which orders may be routed by the trading system 102, and contains data indicative of attributes of the respective order destination, as indicated by data received and/or gathered by the trading system 102. The fields specify: an order destination identifier 300, a response time 302, a fill rate 304, a percentage of total volume 306, data 308 indicative of current order book size (outloud volume—"OLV") less transactions already in queue to the respective order destination (OLV-Q); "overhit" points data 310; "triggers" data 312, and overall speed rating data 314.

The order destination identifier 300 may be a commonly used abbreviation or acronym that identifies the respective order destination. Although the order destination identifiers 300 are represented, for purposes of illustration in FIG. 3, by single letters "A", "B", "C" and "D", it will be appreciated that in practice the actual identifiers, consisting typically of two, three or four letters, will populate the fields corresponding to the order destination identifier 300. Examples of well known order destination identifiers that may be used include "ARCA", "BRUT", "BTRD", "INCA", "ISLD", "NTRD", "PRMX", "REDI", "SM" and "TRAC". Although only four entries are shown in FIG. 3, it should be understood that in practice the number of entries may be equal to the number of order destinations available for receiving orders from the trading system 102 for the particular security or group of securities.

The response time 302 is data, in units of seconds, indicative of an average time elapsed between routing of an order to the respective order destination and either time of execution or receipt of confirmation from the order destination that the order was executed. This information may be generated and updated by the trading system 102 in real time based on its transactions with the various order destinations. The period over which the average response time is calculated for purposes of field 302 may, in some embodiments, be the most recent hour of trading, with updates every five minutes to provide a moving average. As one alternative, the average response time may be calculated over the last three trading sessions.

The fill rate 304 represents the average extent to which orders routed to the respective order destination for the security or securities in question have been filled over a period of time. For example, an order that is totally filled is considered to have exhibited a 100% fill rate. An order that was only half filled (e.g., 100,000 shares routed and 50,000 filled) is considered to have exhibited a 50% fill rate. The period over which the average fill rate is calculated may be, in some embodiments, the immediately preceding trading session plus the current trading session up to the present time. This information may be generated and updated by the trading system 102 in real time based on its transactions with the various order destinations.

The percentage of volume 306 corresponds to the percentage of total volume in the security or group of securities in question handled by the respective order destination relative to the total volume in the security or group of securities. This information may be compiled from market data received via the data source 108. In some embodiments, for example, the percentage of volume 306 may be calculated based on the average daily volume of the order destinations over the last five trading days.

The OLV-Q data 308 may be calculated on the basis of the total size of book orders shown for the respective order destination, less the size of orders already queued for routing from the trading system to the respective order destination. One, two, or more levels of the order destination's book may be taken into account. This information may be derived from a combination of current order book information received from the data source 108 and information generated by the trading system 102 in regard to transactions with the order destinations. OLV-Q data 308 may indicate current, real-time status of the order destinations. In some embodiments, OLV-Q data 308 may be maintained only for databases 212 dedicated to individual securities.

"Overhit" data 310 may be derived from an average extent to which orders have been "overfilled" by the respective order destination and may also be based in part on the size of the orders overfilled. In some embodiments no overhit data may be indicated for an order destination showing less than 1,000 shares on its order book. An order may be considered "overfilled" when the size of the order exceeded the size of the orders on the order destination book, but the order was nevertheless filled in excess of the size of the orders on the order destination book. Thus "overhit" data may be indicative of hidden liquidity at the order destination. In some embodiments, the overhit data may be compiled over a period that corresponds to the immediately preceding trading session plus the current trading session up to the current time. This information may be derived from a combination of order book information received from the data source 108 and information generated by the trading system 102 in regard to transactions engaged in by the trading system with the order destinations.

The "triggers" data 312 indicates preference factors that may be entered into the database 212 or 214 by the proprietor of the trading system 102 to implement preferences for routing orders to one or more of the order destinations. The triggers may represent agreements entered into between the order destinations and the proprietor of the trading system 102, and/or subjective judgments by the proprietor of the trading system 102 about the merits of the order destinations, and/or may be based on technological capabilities or other objective characteristics of the order destinations. As will be seen, trigger data essentially implements weighting factors to favor certain order destinations in routing decisions.

The speed rating data 314 may be calculated and updated in real time on the basis of the data in fields 302-312. In some embodiments, for a particular order destination all of the data in fields which may positively correlate to speedy order execution (e.g., the data in fields 304, 306, 308, 310 and 312) may be multiplied together, and the resulting product may then be multiplied by the inverse of the data in fields (if any) which may negatively correlate to speedy order execution (e.g., the data in field 302). The resulting product may be, for example, divided by a factor of 1,000 or 10,000, and truncated to an integer, to yield the speed rating data 314 for the respective order destination.

It will be appreciated that the above procedure for calculating speed rating data 314 effectively provides equal weights to all of the factors represented by the data in fields 302-312. Alternatively, the data in fields 302-312 may be combined additively rather than multiplicatively, and a weighting factor may be applied to one or more of the factors represented by the data in fields 302-312 to generate the rating data 314. Other procedures for generating rating data from one or more types of order destination attribute data may alternatively be used.

Some or all of the order destination attributes corresponding to the fields 302-312 may be eliminated and/or replaced with other attributes of order destinations. To give just one example, the fill rate data 304 may be replaced with or supplemented by data that reflects "fill quality", i.e., the extent to which orders are filled on the order destination in question at a better price than an order limit price.

Referring now to FIG. 4, a table represents an order destination attribute database 212 or 214 for use when obtaining the best price is a primary aim of a routing determination. This database is described in detail below and depicted with exemplary entries in the accompanying figure.

The database illustrated in FIG. 4 may contain data relating to trading in a single security, in which case the database is one of the order destination databases 212 relating to individual securities. Alternatively, the database illustrated in FIG. 4 may be a "generic" order destination attribute database 214, and so may contain data relating to trading in a plurality of securities (e.g., all securities available for trading or served by a particular market, or all securities available for trading or served by a particular market for which an individual database 212 is not maintained).

Order destination attribute database 212 or 214 (as depicted in FIG. 4) contains data gathered as to a plurality of order destinations. The data may be indicative of the likely performance of the order destinations in regard to obtaining the best price for an order that may be routed to the order destinations. This data may be generated on the basis of trading and/or order book information received on a batch or real-time basis from the data source 108 (FIG. 1) and/or may be based on experience accumulated by the trading system 102 in direct dealings with the order destinations.

As depicted, the table defines a number of fields 400-412 for each of the entries. Each entry corresponds to a respective order destination to which orders may be routed by the trading system 102, and contains data indicative of attributes of the respective order destination, as indicated by data received and/or gathered by the trading system 102. The fields specify: an order destination identifier 400, average time at NBBO (national best bid or offer) data 402; percentage of time at NBBO data 404, number of times at NBBO data 406, average time required to join NBBO 408, "triggers" data 410 and overall price rating data 412.

The information in field 400 may be the same as the information described above in connection with field 300 shown in FIG. 3.

The average time at NBBO data 402 may indicate, for the respective order destination, the average amount of time the best order on the book of the order destination matched the NBBO price as measured per occasion when the best book order matched the NBBO price. Although not indicated in the drawing, separate statistics may be maintained for matching the bid and asked NBBO. This data may be generated by the trading system 102 by suitable analysis based on real-time data received via the data source 108. In some embodiments, the average may be compiled over the most recent ten trading sessions. Thus this data may represent an average amount of time that the respective order destination offered a best price for the particular security relative to other order destinations.

The percentage of time at NBBO data 404 may indicate, for the respective order destination, the percentage of a specified period of time during which the best order on the book of the order destination matched the NBBO price. Again, separate statistics may be maintained for matching the bid and asked NBBO, although such separate statistics are not illustrated in the drawing. Also, the data 404 may be generated by the trading system by suitable analysis based on real-time data received via the data source 108 and may be compiled, in some embodiments, over the most recent ten trading sessions. Thus this data may represent a percentage of at least one trading session during which the respective order destination offered a best price for the particular security relative to other order destinations.

The number of times at NBBO data 406 may indicate, for the respective order destination, a tabulated total of occasions on which the best order on the book of the order destination matched the NBBO price. Once more, separate statistics may be maintained for matching the bid and asked NBBO, although such separate statistics are not illustrated in the drawing. Also, the data 406 may be generated by the trading system by suitable analysis based on real time data received via the data source 108 and may be compiled, in some embodiments, over the most recent ten trading sessions. Thus this data may represent a number of times during at least one trading session at which the respective order destination offered a best price for the particular security relative to other order destinations.

The average time to join NBBO data 408 may indicate, for the respective order destination, an average duration of the occasions on which the best book order price of the order destination does not match the NBBO price. Again, separate statistics may be maintained for time to join the bid and asked NBBO, although such separate statistics are not illustrated in the drawing. Also, the data 408 may be generated by the trading system by suitable analysis based on real time data received via the data source 108 and may be compiled, in some embodiments, over the most recent ten trading sessions. Thus this data may represent an average amount of time required during at least one trading session for the respective order destination to match a best price offered for the particular security by another order destination.

The information in field 410 may serve the same function as the information discussed above in connection with field 312 in FIG. 3, and indeed may be identical to the information in field 312.

The price rating data 412 may be calculated and updated in real time on the basis of the data in fields 402-410. This may be done in substantially the same manner as the above described calculation of the speed rating data 314 of FIG. 3. That is, in some embodiments, for a particular order destination all of the data in fields which may positively correlate to optimum price performance (e.g., the data in fields 402, 404, 406 and 410) may be multiplied together, and the resulting product may then be multiplied by the inverse of the data in fields (if any) which may negatively correlate with optimum price performance (e.g., the data in field 408). The resulting product again may be, for example, divided by a factor of 1,000 or 10,000, and truncated to an integer, to yield the price rating data 412 for the respective order destination.

It will be appreciated that the above procedure for calculating price rating data 412 effectively provides equal weights to all of the factors represented by the data in fields 402-410. Alternatively, the data in fields 402-410 may be combined additively rather than multiplicatively, and a weighting factor may be applied to one or more of the factors represented by the data in fields 402-410 to generate the rating data 412. Other procedures for generating rating data from one or more types of order destination attribute data may alternatively be used.

Some or all of the order destination attributes corresponding to the fields 402-410 may be eliminated and/or replaced with other attributes of order destinations. For example, some or all of the order destination attributes described with reference to FIG. 3 may be used in place of or in addition to the order destination attributes described with reference to FIG. 4 in calculating the price rating data 412.

It should be noted that the illustrations and accompanying descriptions of databases included herein merely represent relationships between stored information. A number of other arrangements may be employed besides those suggested, including arrangements in which some or all of the specified data is located remote from the device with which it is associated herein. It is further contemplated that each of the databases may include many more records than those shown and that each record may include associated fields other than those illustrated.

Figure 5:
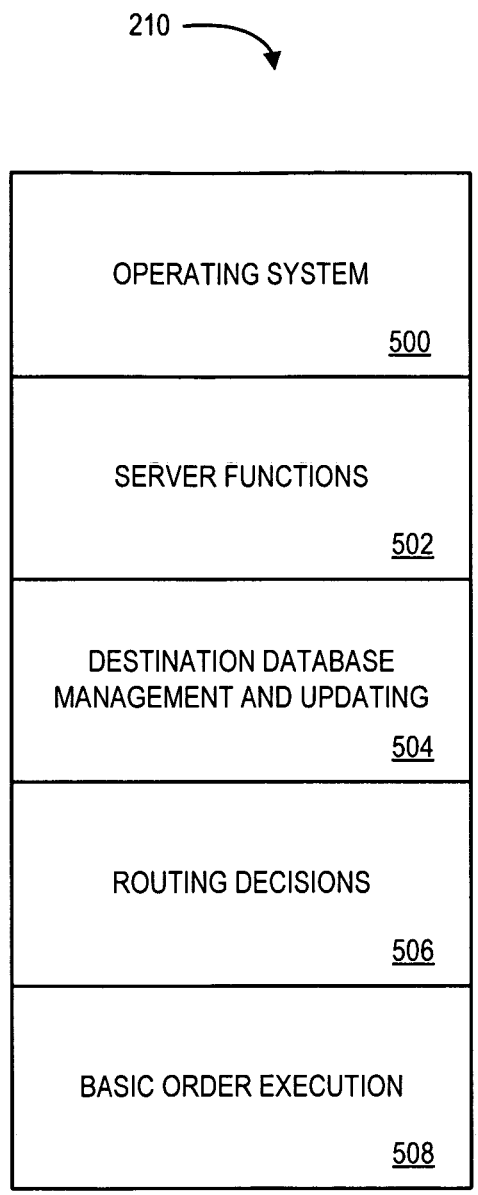
FIG. 5 illustrates in block form components of software that controls operation of the trading system of FIG. 2.

FIG. 5 illustrates in block form aspects of the programs 210 referred to above in connection with FIG. 2. As seen from FIG. 5, the programs 210 may include operating system software 500, which may control basic functions of the trading system 102 (FIG. 2). Continuing to refer to FIG. 5, the programs 210 may also include software components 502, which enable the trading system to function as a server computer with respect to external devices such as the customer devices 104 (FIG. 1).

Still referring to FIG. 5, the programs 210 may further include software 504 to perform functions for managing and updating the order destination attribute databases 212, 214 described above in accordance with aspects of the present invention. The database management and updating software 504 may comprise or be based upon, for example, a commercially available database management package such as Sybase®. Further details of operation of the database management and updating software 504 will be described below.

In addition, the programs 210 may include software 506 to enable the trading system 102 to perform routing decisions in accordance with aspects of the present invention with respect to orders received by the trading system 102 from customers 104. The routing decision software 506 may make routing decisions based at least in part on data contained in the order destination attribute databases 212, 214. Details of operation of the routing decision software 506 will be described below.

Further, the programs 210 may include software 508 to enable the trading system 102 to perform basic order execution functions. The order execution software 508 may operate generally in accordance with conventional principles, but may be responsive to the routing decision software 506 to implement routing decisions made by the routing decision software 506.

It should be understood that the programs 210 may perform other functions and/or may include other components in addition to the software illustrated and described in connection with FIG. 5.

Figure 6:
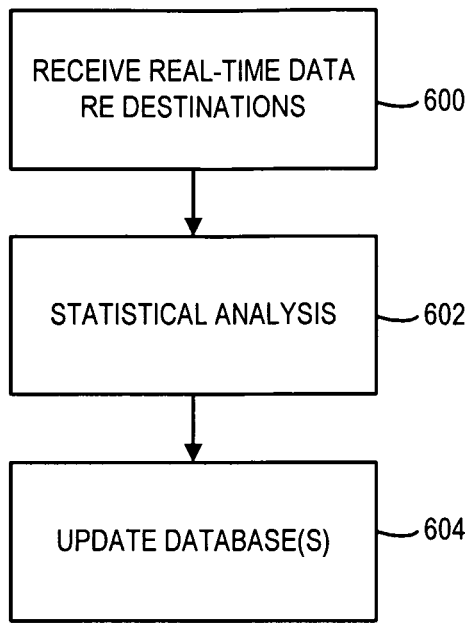
FIG. 6 is a flow diagram that illustrates an exemplary process for maintaining and updating the databases of FIGS. 3 and 4.

FIG. 6 is a flow diagram that illustrates operation of the order destination attribute database management and updating software 504. As indicated at 600 in FIG. 6, the software 504 and/or another software component of programs 210 may receive real-time market data from one or more data sources 108 (FIG. 1). The data received at 600 may indicate one or more of trading activity and current order book conditions at some or all of the order destinations to which the trading system 102 may route orders. In addition, the software 504 and/or other components of programs 210 may compile data that represents trading experience of the trading system 102 itself. For example, response time, overfill and/or overhit data may be compiled at least in part from the trading system's interactions with various ones of the order destinations.

As indicated at 602, the software 504 may also perform statistical analysis as required to generate and/or update the data for the order destination attribute databases 212, 214 on the basis of data either received from data source 108 or available from transactions executed by the trading system 102. As will be appreciated from the foregoing discussion of FIGS. 3 and 4, the statistical analysis may produce one or more of the types of data discussed in connection with the fields 302, 304, 306, 308 and 310 (FIG. 3); and in connection with the fields 402, 404, 406, and 408 (FIG. 4). Alternatively, other types of order destination attribute data may be produced by the statistical analysis. These types of data may be produced for all of the order destinations from which the trading system may choose in making order routing decisions. In some embodiments, the ultimate products of the statistical analysis may be the speed rating data 314 and the price rating data 412 for the order destinations. In some embodiments, the data for the databases 212, 214, including the speed rating data 314 and the price rating data 412 may be updated on a regular basis and/or substantially in real time. Updating of the databases 312, 314 on the basis of the statistical analysis of 602 is indicated at 604 in FIG. 6. It should be understood that the processes 600-604 may all be ongoing and overlapping in time with each other.

Figure 7:
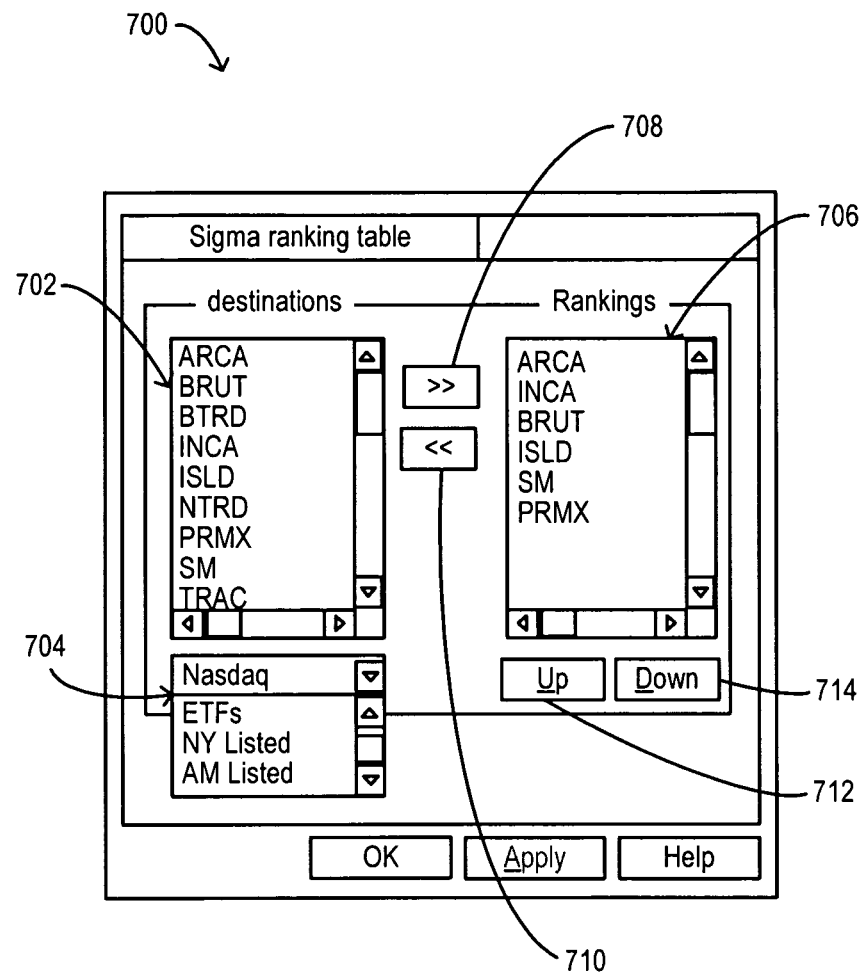
FIG. 7 is an outward view of a user interface according to some embodiments of the invention.

FIG. 7 is an outward view of a user interface 700 that may, according to some embodiments of the invention, be used to provide user input for the trigger data 312 (FIG. 3) or 410 (FIG. 4) or for otherwise assigning priorities among order destinations based on operator input. The user interface 700 may, for example, be displayed by the operator device 109 (display device not separately shown).

As seen from FIG. 7, the user interface 700 may include a first scrollable list 702 of order destination identifiers. As noted above in connection with field 300 of FIG. 3, the order destination identifiers may be standard identifiers consisting of a few letters and representing respective ones of the order destinations to which the trading system may route orders. In some embodiments, a plurality of different first scrollable lists of order destination identifiers may be displayed at 702 at respective times. The list of destinations indicated in the first scrollable list 702 may change depending on the particular securities market selected in a pull-down menu 704. It will be seen that the items selectable in the pull-down menu 704 are identifiers for various securities markets.

The user interface 700 also includes a second scrollable list 706 of order destination identifiers which may represent an ordering of at least some of the order destination identifiers of the current displayed first scrollable list 702. An order destination identifier that does not currently appear in the second scrollable list 706 may be added to the second scrollable list 706 by selecting with a cursor (not shown) the order destination identifier in the first scrollable list 702 and then actuating "add" button 708. An order destination identifier that currently appears in the second scrollable list 706 may be removed therefrom by selecting the order destination identifier in the second scrollable list 706 and then actuating "remove" button 710.

The relative positions of the order destination identifiers in the second scrollable list 706 may be changed by operation of the "up" button 712 and the "down" button 714. More specifically, the position of an order destination identifier that is not at the top of the second scrollable list 706 may be moved up by one position by selecting the order destination identifier and actuating the up button 712. The order destination identifier may be moved up by more than one position by repeated actuation of the up button 712. Similarly, the position of an order destination identifier that is not at the bottom of the second scrollable list 706 may be moved down by one position by selecting the order destination identifier and actuating the down button 714. The order destination identifier may be moved down by more than one position by repeated actuation of the down button 714.

In some embodiments the values of trigger data 312, 410 in databases for securities traded on the market selected by the pull-down menu 704 may correspond to the positions of the respective order destination identifiers in the second scrollable list 706 corresponding to the selected market. In other embodiments, the user's desired preferences among the order destinations, as represented by the order of listing of corresponding order destination identifiers in the second scrollable list 706, may be implemented by other or additional ways besides the trigger data 312, 314. In still other embodiments, an interface (not shown) may be provided to allow the operator to explicitly enter the data for the trigger data fields 312, 410.

Figure 8:
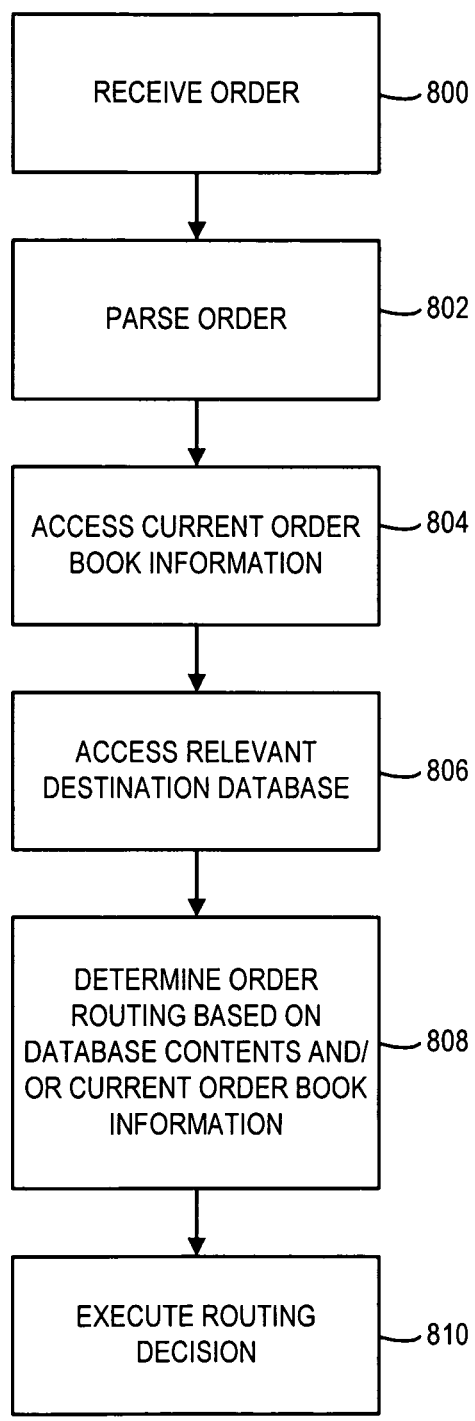
FIG. 8 is a flow diagram that illustrates an exemplary process for routing security trading orders pursuant to an embodiment of the invention.

FIG. 8 is a flow diagram that illustrates an exemplary process for routing security trading orders pursuant to an embodiment of the invention. The process shown in FIG. 8 may be performed by the trading system 102 of FIGS. 1 and 2 and may involve actions by more than one of the programs shown in FIG. 5.

As indicated at 800 in FIG. 8, initially a securities trading order may be received by the trading system 102. The order may include such customary data as a customer identifier, a symbol that identifies the security to be traded, a size of the order (e.g., number of shares or contracts), an execution price for the order, and a type of the order, such as "limit" or "market".

As indicated at 802, the trading system 102 may parse the order received at 800 to detect the data contained in the order and to determine how to proceed with processing the order.

As indicated at 804, the trading system may receive or access data that indicates current order book conditions at the various order destinations for the security specified in the order. This data may be received via the data source 108 and may be buffered in an order book database, which is not shown.

As indicated at 806, the trading system may access a relevant one of the databases 212 or 214. Details of this process will now be discussed with reference to FIG. 9.

Figure 9:
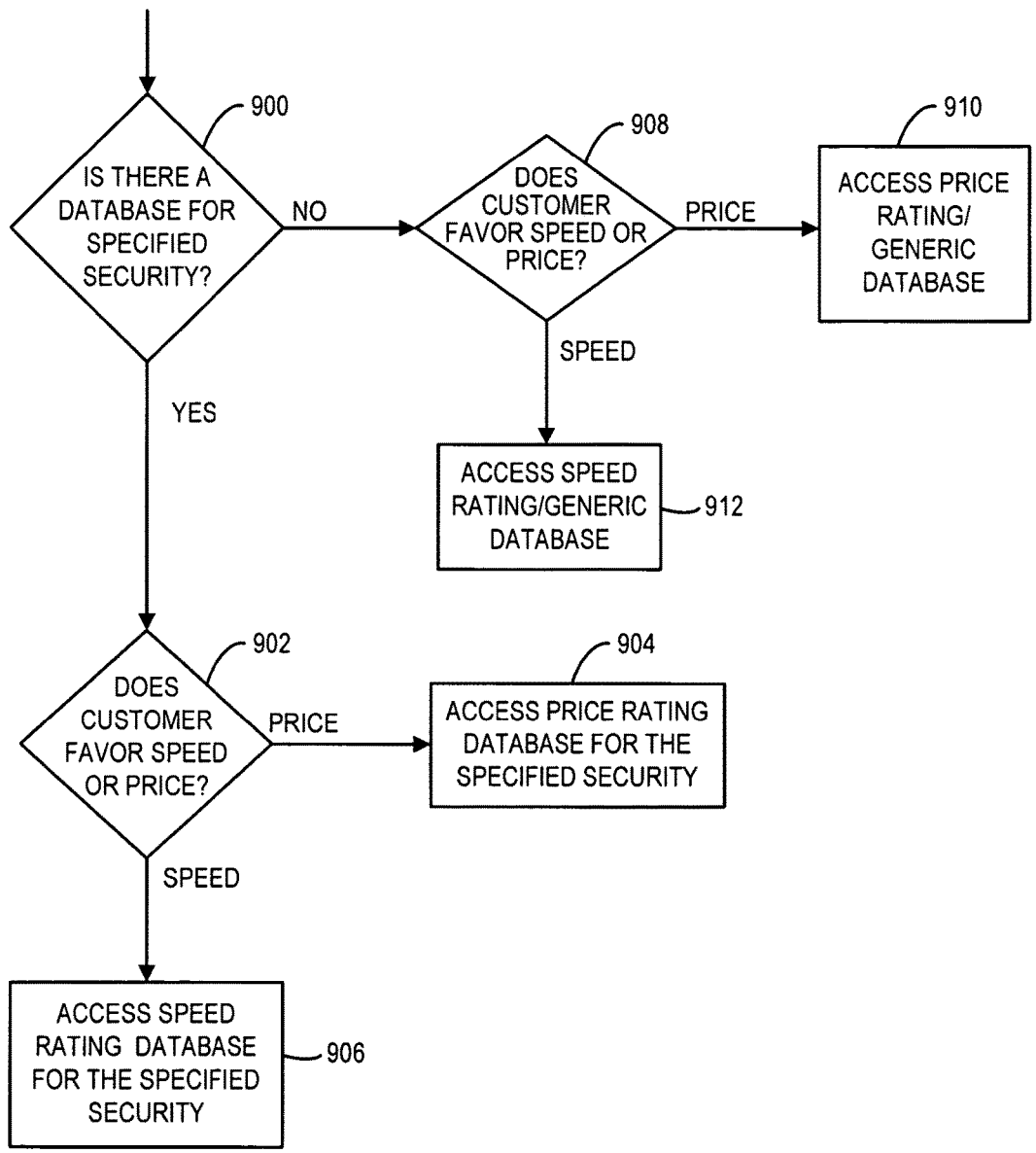
FIG. 9 is a flow diagram that illustrates details of one step of the process of FIG.

As indicated at 900 in FIG. 9, a determination is made as to whether there is a dedicated database 212 for the security specified in the order. If so, then, as indicated at 902, it is determined whether the customer specified in the order favors speed of execution or price performance. If it is determined that the customer favors price performance, then the trading system may access the price rating database 212 (as exemplified in FIG. 4) for the specified security, as indicated at 904. If it is determined that the customer favors speed of execution, then the trading system may access the speed rating database 212 (as exemplified in FIG. 3) for the specified security, as indicated at 906. In other embodiments, the determination as to whether to access the speed rating or price rating database may be made on a basis other than customer identity and/or preference. For example, in some embodiments, that determination may be made on the basis of the order type. For example, the speed rating database may be accessed in the case of a limit order and the price rating database may be accessed in the case of a market order.

Considering again the determination made at 900, if it is found in making that determination that there is no dedicated database 212 for the security specified in the order, then, as indicated at 908, the same determination is made as was discussed in connection with 902. That is, it is determined at 908 whether a price rating database or a speed rating database is to be accessed. This determination may be made on the basis of customer preference, and/or on some other basis, as discussed in connection with 902. If it is determined at 908 that a price rating database should be accessed, then the trading system may access the "generic" price rating database 214 (exemplified in FIG. 4), as indicated at 910. If it is determined at 908 that a speed rating database should be accessed, then the trading system may access the "generic" speed rating database 214 (exemplified in FIG. 3), as indicated at 912.

Referring again to FIG. 8, a decision may be made as to how to route the order, as indicated at 808. This determination may, for example, be made based at least in part on one or both of current order book information accessed at 804 and the order destination rating data (speed or price rating; security-specific or generic) accessed at 806. In some embodiments, it may be the case in some instances that the current order book information favors a certain order destination to such a degree that the order destination rating data accessed at 806 may be disregarded (or accessing of the order destination rating data may be omitted entirely), and the entire order may be routed to the order destination favored by the current order book information. In some embodiments, in some situations the current order book information may be neutral among the order destination, so that the current order book information may be disregarded, and the routing decision may be based entirely or largely on the price rating or speed rating data accessed at 806.

Figure 10:
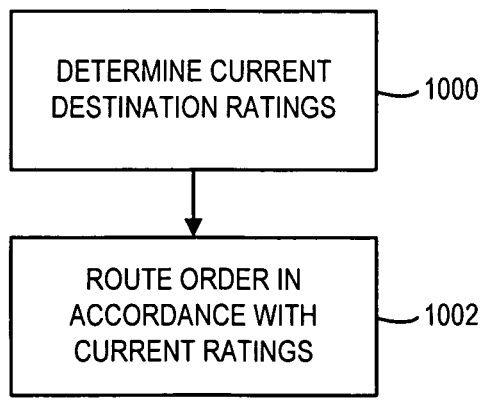
FIG. 10 is a flow diagram that illustrates details of another step of the process of FIG. 8.

Some details of making a routing decision based entirely or largely on the data accessed at 806 will now be discussed with reference to FIG. 10. As indicated at 1000 in FIG. 10, the current order destination rating data (speed rating or price rating, as appropriate; security-specific or generic, as appropriate) is determined. This may be done by reference to the data accessed at 806 (FIG. 8). Then, as indicated at 1002, a routing decision and/or an order allocation decision may be made based at least in part on the current order destination rating data determined at 1000. In some embodiments, the entire order may be routed to the order destination which has the highest rating. For example, the entire order may be routed to the order destination having the highest rating when the order is relatively small. In some embodiments, the order may be allocated among the order destinations substantially in proportion to their relative ratings, as determined at 1000. This may be done, for example, in the case of relatively large orders. The actual order sizes sent to the individual order destinations, in the case of an allocation of an order among the order destinations, may be rounded up or down to round lots. The rounding process may favor rounding up the allocations to the higher rated order destinations and rounding down the allocations to the lower rated order destinations. Other (e.g., more complex) allocation procedures based on the rating data may alternatively be employed.

From the description in the previous paragraph and from other foregoing portions of this disclosure, including the descriptions of FIGS. 3 and 4, it will be appreciated that the order routing determination made at 1002 (FIG. 10) and/or at 808 (FIG. 8) may be based at least in part on one or more of the order destination attributes referred to in connection with FIGS. 3 and 4.

Referring once more to FIG. 8, and as indicated at 810, execution of the order received at 800 may proceed in accordance with the routing decision made at 808. The execution of the order may include routing the order to one or more of the order destinations in accordance with the routing decision made at 808.

The flow diagrams shown in FIGS. 6 and 8-10 should not be taken to imply a fixed order of steps. In various embodiments of the invention, process steps described herein may be performed in any order that is practicable.

In embodiments described above, the trading system 102 stores some order destination attribute databases that include so-called "speed rating" data and other order destination attribute databases that include so-called "price rating" data. However, in other embodiments of the invention, such databases may be combined and/or a single rating may be provided that is indicative of relative merit of order destinations with respect to both speed of execution and price performance. In other embodiments of the invention, either one of the speed rating databases or the price rating databases may be omitted. It should also be understood that in any one or more of the databases described in this paragraph, the numbers and types of order destination attributes upon which speed, price or other ratings are determined may be varied from the numbers and types of order destination attributes included in the example databases illustrated in FIGS. 3 and 4.

In some embodiments, both current order book conditions of the order destinations and order destination attributes and/or ratings such as those described with reference to FIGS. 3 and 4 may be factored into routing decisions made in accordance with the present invention. In some embodiments, other factors, including the extent to which an order destination is automated, may also be considered in making routing decisions in accordance with the invention.

In some embodiments, routing decisions in accordance with the invention may be made with respect to all orders received by the trading system. In some embodiments, routing decisions in accordance with the invention may be made with respect to some but not all orders received by the trading system.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. An apparatus comprising:
   at least one communication interface configured to communicate over at least one communication network;
   at least one processor; and
   at least one storage device storing instructions that when executed cause the at least one processor to:
      receive, via the at least one communication interface, a first order associated with a particular security during a trading session;
      obtain, from at least one database, information associated with multiple securities exchanges or electronic communication networks (ECNs), at least part of the information related to speeds of the securities exchanges or ECNs in executing orders for securities;
      determine a percentage of total market volume in the particular security handled during the trading session by each of at least some of the securities exchanges or ECNs;
      determine during the trading session, based at least in part on at least some of the information and the determined percentages of total market volume, (a) two or more of the securities exchanges or ECNs to be used to execute the first order and (b) a proportion of the first order to allocate to each of the two or more securities exchanges or ECNs;
      route, via the at least one communication interface, the first order to the two or more securities exchanges or ECNs in accordance with the proportions allocated to the two or more securities exchanges or ECNs for execution;
      receive, via the at least one communication interface, responses associated with the first order from the two or more securities exchanges or ECNs;
      dynamically update at least a portion of the information in the at least one database based on data associated with performance of the securities exchanges or ECNs, at least some of the data relating to the speeds of the securities exchanges or ECNs during the trading session; and
      use at least some of the dynamically updated information to route a second order during the trading session.

2. The apparatus according to claim 1, wherein each percentage of total market volume is based on an average daily volume of the particular security handled by one the securities exchanges or ECNs over five previous trading days.

3. An apparatus comprising:
   at least one communication interface configured to communicate over at least one communication network;
   at least one processor; and
   at least one storage device storing instructions that when executed cause the at least one processor to:
      receive, via the at least one communication interface, a first order associated with a particular security during a trading session;
      obtain, from at least one database, information associated with multiple securities exchanges or electronic communication networks (ECNs), at least part of the information related to speeds of the securities exchanges or ECNs in executing orders for securities;
      determine a degree to which each of at least some of the securities exchanges or ECNs is overfilling orders for the particular security during the trading session;
      determine during the trading session, based at least in part on at least some of the information and the determined degrees to which the at least some of the securities exchanges or ECNs are overfilling orders, (a) two or more of the securities exchanges or ECNs to be used to execute the first order and (b) a proportion of the first order to allocate to each of the two or more securities exchanges or ECNs;
      route, via the at least one communication interface, the first order to the two or more securities exchanges or ECNs in accordance with the proportions allocated to the two or more securities exchanges or ECNs for execution;
      receive, via the at least one communication interface, responses associated with the first order from the two or more securities exchanges or ECNs;
      dynamically update at least a portion of the information in the at least one database based on data associated with performance of the securities exchanges or ECNs, at least some of the data relating to the speeds of the securities exchanges or ECNs during the trading session; and
      use at least some of the dynamically updated information to route a second order during the trading session.

4. The apparatus according to claim 3, wherein the degree to which one of the securities exchanges or ECNs is overfilling orders for the particular security is determined based in part on a size of the overfilled orders by that securities exchange or ECN.

5. An apparatus comprising:
at least one communication interface configured to communicate over at least one communication network;
at least one processor; and
at least one storage device storing instructions that when executed cause the at least one processor to:
receive, via the at least one communication interface, a first order associated with a particular security during a trading session;
obtain, from at least one database, information associated with multiple securities exchanges or electronic communication networks (ECNs), at least part of the information related to speeds of the securities exchanges or ECNs in executing orders for securities;
determine at least one attribute of each of at least some of the securities exchanges or ECNs, wherein each attribute is selected from the group consisting of: (a) an average amount of time that one of the securities exchanges or ECNs offered a price for the particular security at least as good as other order destinations; (b) a percentage of the trading session during which one of the securities exchanges or ECNs offered a price for the particular security at least as good as other order destinations; and (c) an average amount of time required during the trading session for one of the securities exchanges or ECNs to match a price offered for the particular security by another order destination;
determine during the trading session, based at least in part on at least some of the information and the determined attributes, (a) two or more of the securities exchanges or ECNs to be used to execute the first order and (b) a proportion of the first order to allocate to each of the two or more securities exchanges or ECNs;
route, via the at least one communication interface, the first order to the two or more securities exchanges or ECNs in accordance with the proportions allocated to the two or more securities exchangs or ECNs for execution;
receive, via the at least one communication interface, responses associated with the first order from the two or more securities exchanges or ECNs;
dynamically update at least a portion of the information in the at least one database based on data associated with performance of the securities exchanges or ECNs, at least some of the data relating to the speeds of the securities exchanges or ECNs during the trading session; and
use at least some of the dynamically updated information to route a second order during the trading session.

6. The apparatus according to claim 1, wherein the instructions when executed further cause the at least one processor to:
generate at least part of the data associated with the performance of the securities exchanges or ECNs based on electronic interactions between the apparatus and the securities exchanges or ECNs.

7. The apparatus according to claim 1, wherein communications over the at least one communication network are encrypted.

8. The apparatus according to claim 1, wherein the at least one database comprises:
information regarding the performance of the securities exchanges or ECNs related to individual securities; and
information regarding the performance of the securities exchanges or ECNs without regard to individual securities.

9. The apparatus according to claim 1, wherein:
the at least one database comprises a speed rating associated with each of the securities exchanges or ECNs;
each speed rating is based on multiple factors associated with one of the securities exchanges or ECNs; and
the instructions when executed cause the at least one processor to dynamically update one or more of the factors and the speed rating associated with one or more of the securities exchanges or ECNs.

10. The apparatus according to claim 9, wherein the speed rating for each of the securities exchanges or ECNs is (i) positively correlated with one or more of the factors associated with that securities exchange or ECN and (ii) negatively correlated with one or more of the factors associated with that securities exchange or ECN.

11. The apparatus according to claim 9, wherein:
the instructions when executed further cause the at least one processor to:
present a graphical user interface to a user; and
receive input from the user via the graphical user interface, the input defining user preferences for routing orders to the securities exchanges or ECNs; and
the speed ratings associated with the securities exchanges or ECNs are based partially on the user preferences.

12. The apparatus according to claim 1, wherein another part of the information in the at least one database relates to prices obtained by the securities exchanges or ECNs in executing orders for securities.

13. The apparatus according to claim 3, wherein the instructions when executed further cause the at least one processor to:
generate at least part of the data associated with the performance of the securities exchanges or ECNs based on electronic interactions between the apparatus and the securities exchanges or ECNs.

14. The apparatus according to claim 3, wherein communications over the at least one communication network arc encrypted.

15. The apparatus according to claim 3, wherein the at least one database comprises:
information regarding the performance of the securities exchanges or ECNs related to individual securities; and
information regarding the performance of the securities exchanges or ECNs without regard to individual securities.

16. The apparatus according to claim 3, wherein:
the at least one database comprises a speed rating associated with each of the securities exchanges or ECNs;
each speed rating is based on multiple factors associated with one of the securities exchanges or ECNs; and
the instructions when executed cause the at least one processor to dynamically update one or more of the factors and the speed rating associated with one or more of the securities exchanges or ECNs.

17. The apparatus according to claim 16, wherein the speed rating for each of the securities exchanges or ECNs is (i) positively correlated with one or more of the factors associated with that securities exchange or ECN and (ii)

negatively correlated with one or more of the factors associated with that securities exchange or ECN.

18. The apparatus according to claim 16, wherein:
the instructions when executed further cause the at least one processor to:
present a graphical user interface to a user; and
receive input from the user via the graphical user interface, the input defining user preferences for routing orders to the securities exchanges or ECNs; and
the speed ratings associated with the securities exchanges or ECNs are based partially on the user preferences.

19. The apparatus according to claim 3, wherein another part of the information in the at least one database relates to prices obtained by the securities exchanges or ECNs in executing orders for securities.

20. The apparatus according to claim 5, wherein the instructions when executed further cause the at least one processor to:
generate at least part of the data associated with the performance of the securities exchanges or ECNs based on electronic interactions between the apparatus and the securities exchanges or ECNs.

* * * * *